US010464497B2

(12) United States Patent
Kondo et al.

(10) Patent No.: US 10,464,497 B2
(45) Date of Patent: Nov. 5, 2019

(54) ROOF BOX (71) Applicant: CAR MATE MFG. CO., LTD., Tokyo (JP)

(72) Inventors: Takashi Kondo, Tokyo (JP); Daisuke Kisaka, Tokyo (JP); Motoki Tomita, Tokyo (JP); Ken Sugiura, Tokyo (JP); Tatsuyuki Aono, Tokyo (JP)

(73) Assignee: CAR MATE MFG. CO., LTD., Tokyo (JP)

( * ) Notice: Subject to any disclaimer, the term of this patent is extended or adjusted under 35 U.S.C. 154(b) by 0 days.

(21) Appl. No.: 15/769,352

(22) PCT Filed: Sep. 13, 2016

(86) PCT No.: PCT/JP2016/077020
§ 371 (c)(1),
(2) Date: Apr. 19, 2018

(87) PCT Pub. No.: WO2017/073191
PCT Pub. Date: May 4, 2017

(65) Prior Publication Data
US 2018/0297536 A1 Oct. 18, 2018

(30) Foreign Application Priority Data
Oct. 27, 2015 (JP) ................. 2015-211341

(51) Int. Cl.
B60R 9/05 (2006.01)
B60R 9/055 (2006.01)
(Continued)

(52) U.S. Cl.
CPC .............. B60R 9/055 (2013.01); B60R 16/04 (2013.01); E05F 15/611 (2015.01); E05F 15/77 (2015.01);
(Continued)

(58) Field of Classification Search
CPC ......... B60R 9/055; B60R 9/048; B60R 9/065; B60R 16/04; E05F 15/611; E05F 15/77;
(Continued)

(56) References Cited

U.S. PATENT DOCUMENTS 3,640,423 A * 2/1972 Parker ............... B60R 11/06
220/324
5,727,835 A * 3/1998 Krush ................ B60R 9/00
224/404
(Continued)

FOREIGN PATENT DOCUMENTS

DE 20 2010 012544 U1 12/2010
JP H07-324551 A 12/1995
(Continued)

OTHER PUBLICATIONS

Aug. 28, 2018 Search Report issued in European Patent Application No. 16859428.1.
(Continued)

Primary Examiner — Corey N Skurdal
(74) Attorney, Agent, or Firm — Oliff PLC (57) ABSTRACT A roof box includes: a body; lock mechanisms in both sides of the body to engage and fasten a storage portion and an openable/closable cover; unfastening mechanisms in each of the lock mechanisms provided in both sides of the body to release the engagement and fastening; opening/closing means to open or close the openable/closable cover with respect to any one of the lock mechanisms when the engagement and fastening of the other lock mechanism is released; a manipulation means to transmit an opening/closing operation signal for selecting the lock mechanisms for releasing the engagement and fastening and opening or closing the openable/closable cover using the opening/closing means; and a control means to receive the opening/closing operation signal from the manipulation means, output an engagement release signal to the selected lock mechanism, and output an opening/closing signal for releasing the openable/closable cover to the opening/closing means after the engagement is released.

5 Claims, 10 Drawing Sheets (51) Int. Cl.
*B60R 16/04* (2006.01)
*E05F 15/611* (2015.01)
*E05F 15/77* (2015.01)

(52) U.S. Cl.
CPC ..... *E05Y 2400/612* (2013.01); *E05Y 2400/66* (2013.01); *E05Y 2900/602* (2013.01)

(58) Field of Classification Search
CPC ........... E05Y 2400/612; E05Y 2400/66; E05Y 2900/602
USPC .......................................................... 224/328
See application file for complete search history.

(56) References Cited

U.S. PATENT DOCUMENTS 5,823,411 A * 10/1998 Gronwoldt .............. B60R 9/055
           224/328
7,416,098 B2 * 8/2008 Settelmayer ............ B60R 9/058
           224/309
2004/0118889 A1 * 6/2004 Hamilton ................... B62J 9/00
           224/413
2010/0065596 A1 * 3/2010 Lim ....................... B62H 5/001
           224/413

FOREIGN PATENT DOCUMENTS

JP    H08-258630 A    10/1996
JP    H11-129824 A    5/1999
JP    2006-027475 A   2/2006

OTHER PUBLICATIONS

Oct. 18, 2016 International Search Report issued in International Patent Application No. PCT/JP2016/077020.
Oct. 18, 2016 Written Opinion issued in International Patent Application No. PCT/JP2016/077020.

* cited by examiner

ROOF BOX

TECHNICAL FIELD

The present invention relates to a roof box, and more particularly, to a roof box having a mechanism capable of electromotive opening and closing operations.

BACKGROUND ART

In the prior art, a roof box having an electromotive opening/closing mechanism is discussed in Patent Document 1. The roof box discussed in Patent Document 1 has lock mechanisms on both longitudinal side faces. For this reason, as the opening/closing mechanism is operated after releasing any one of the lock mechanisms, the other lock mechanism not released serves as a hinge between a storage portion and an openable/closable cover for the opening/closing operation.

CITATION LIST

Patent Documents

Patent Document 1: Japanese Unexamined Patent Application Publication No. 2006-27475

SUMMARY OF INVENTION

In the roof box discussed in Patent Document 1, since the opening/closing operation of the cover is automatically performed, a work of using a pedal or the like is not necessary for the cover opening/closing operation, and workability in the operation is improved. However, in the roof box discussed in Patent Document 1, it is necessary to manually perform releasing manipulation of the lock mechanism. For this reason, convenience of a remote controllable manipulation means is halved. In addition, no consideration has been made regarding nipping during a cover closing operation, contact with an obstacle during the opening operation, and detection of whether or not the cover is opened at the beginning of movement of the vehicle and during running of the vehicle. Therefore, there was a problem in terms of safety.

In view of the aforementioned problems of the prior art, it is therefore an object of the invention to provide a roof box capable of automatizing operations from a fastening release operation to an opening/closing operation in any one of left and right sides of the openable/closable cover in a vehicle travel direction and ensuring safety during the opening/closing operation of the openable/closable cover and the vehicle travel.

According to a first aspect of the invention, there is provided a roof box including: a roof box body having a storage portion and an openable/closable cover; lock mechanisms provided in both sides of the roof box body along a travel direction to engage and fasten the storage portion and the openable/closable cover while the roof box body is mounted; fastening release means installed in each of the lock mechanisms provided in both sides of the roof box body to release the engagement and fastening; opening/closing means configured to open or close the openable/closable cover with respect to any one of the lock mechanisms when the engagement and fastening of the other lock mechanism is released; a manipulation means configured to transmit an opening/closing operation signal for selection of the lock mechanisms for releasing the engagement and fastening and opening/closing of the openable/closable cover using the opening/closing means; and a control means configured to receive the opening/closing operation signal from the manipulation means, output an engagement release signal to the selected one of the lock mechanisms, and output an opening/closing signal for releasing the openable/closable cover to the opening/closing means after the engagement is released.

According to a second aspect of the invention, the roof box described in the first aspect may further include an opened/closed state detection means that detects a side in which the openable/closable cover is released. In addition, the control means may determine whether or not a side where engagement of the lock mechanism is released matches a side detected by the opened/closed state detection means as being released. A command signal for stopping the opening/closing operation of the openable/closable cover may be output to the opening/closing means if the sides do not match as a result of the determination.

According to a third aspect of the invention, the roof box described in the first or second aspect may further include a detection means configured to detect an operation acceleration of the openable/closable cover while the opening/closing operation of the openable/closable cover using the opening/closing means is performed at a constant speed. In addition, the control means may output a command signal for stopping or reversing the opening/closing operation of the openable/closable cover to the opening/closing means when deceleration or acceleration generated by a force applied from an outside to the openable/closable cover is detected.

According to a fourth aspect of the invention, in the roof box described in any one of the first to third aspects, the detection means may have an acceleration detection function in a direction along a vehicle travel direction. In addition, the control means may have a function for outputting a notification signal in response to detection of the acceleration in a direction along the vehicle travel direction in at least one of a case where the opened/closed state detection means detects that any one side of the openable/closable cover is released and a case where the engagement and fastening of the lock mechanism is released. Furthermore, the manipulation means may have a notification function for receiving and notifying the notification signal from the control means.

According to a fifth aspect of the invention, in the roof box described in any one of the first to fourth aspects, the manipulation means may be a portable terminal having a communication unit capable of communicating with the control means.

According to a sixth aspect of the invention, in the roof box described in any one of the first to fifth aspects, the roof box body may have a power supply means configured to supply power necessary in the opening/closing operation. In addition, the roof box body may have an emergency opening/closing portion for extracting the power supply means without opening the openable/closable cover.

According to the first aspect of the invention, it is possible to realize automatization from the fastening release operation to the opening/closing operation in any one of left and right sides of the openable/closable cover in the vehicle travel direction.

According to the second aspect of the invention, it is possible to prevent an error in the opening/closing operation and improve safety.

According to the third aspect of the invention, the opening/closing operation of the openable/closable cover stops or is reversed even when a load applied to the opening/closing means is small due to a distortion of the openable/closable cover in a case where an article is nipped between the openable/closable cover and the storage portion, or the opening operation of the openable/closable cover is interfered by an obstacle. Therefore, it is possible to improve safety.

According to the fourth aspect of the invention, it is possible to prevent a vehicle from traveling while the openable/closable cover is opened. Therefore, it is possible to improve safety.

According to the fifth aspect of the invention, it is not necessary to install a manipulation means in a vehicle. For this reason, it is possible to facilitate placement and installation of the roof box. In addition, according to the fifth aspect of the invention, it is possible to automatically release the fastening of the openable/closable cover in response to selection from the manipulation means. Therefore, it is possible to select an opening direction of the openable/closable cover and appropriately open the openable/closable cover even in a remote control manner.

According to the sixth aspect of the invention, even when the roof box body is not opened or closed due to a dead battery, it is possible to operate the roof box by replacing the battery.

DESCRIPTION OF EMBODIMENTS

Figure 1:
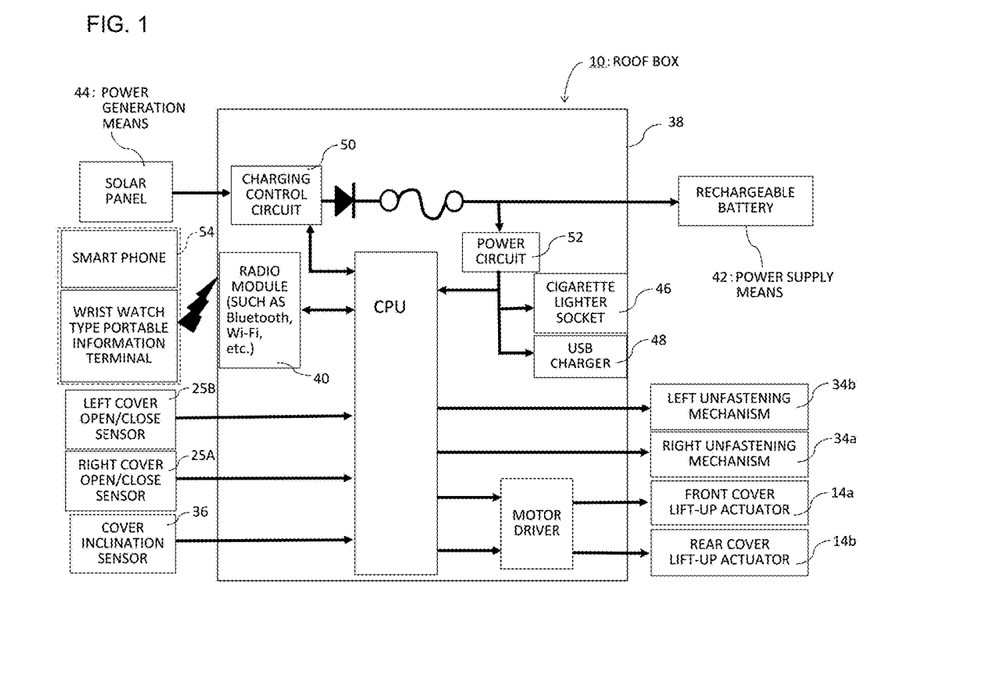
FIG. 1 is an image configuration diagram illustrating a roof box as a whole according to an embodiment.

A roof box according to an embodiment of the present invention is now be described in details with reference to the accompanying drawings. First, a whole image configuration of the roof box according to an embodiment is illustrated in FIG. 1, and its individual components are described with reference to FIGS. 2 to 7. Note that the embodiment described below provides one of preferable modes that the invention can be embodied, and its specific configuration is not particularly limited as long as each element exhibits its function.

The roof box 10 according to this embodiment basically includes a roof box body 12 (refer to FIGS. 2 and 3), opening/closing means 14a and 14b, a detection means 36, a control means 38, and a manipulation means 54. The roof box body 12 has a storage portion 12a and an openable/closable cover 12b.

Figure 2:
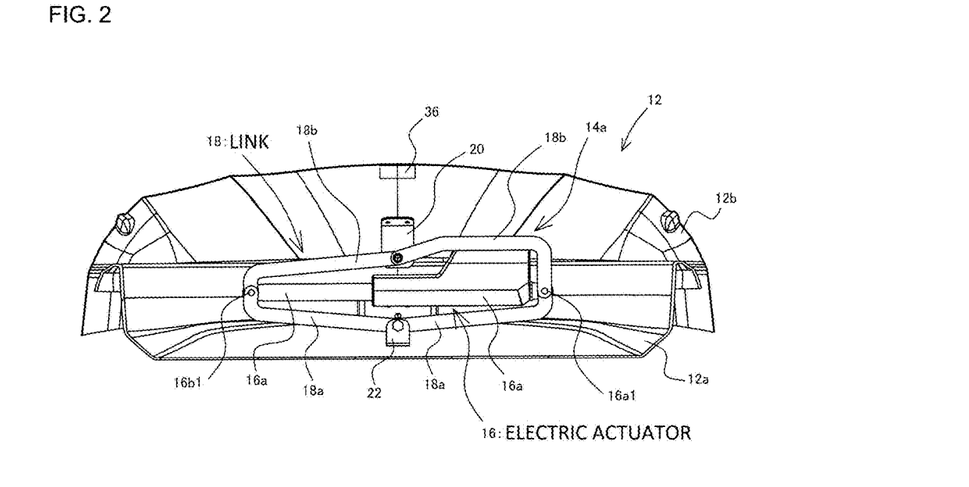
FIG. 2 is a partially cross-sectional side view illustrating a configuration of a roof box body in a closed state.
Figure 3:
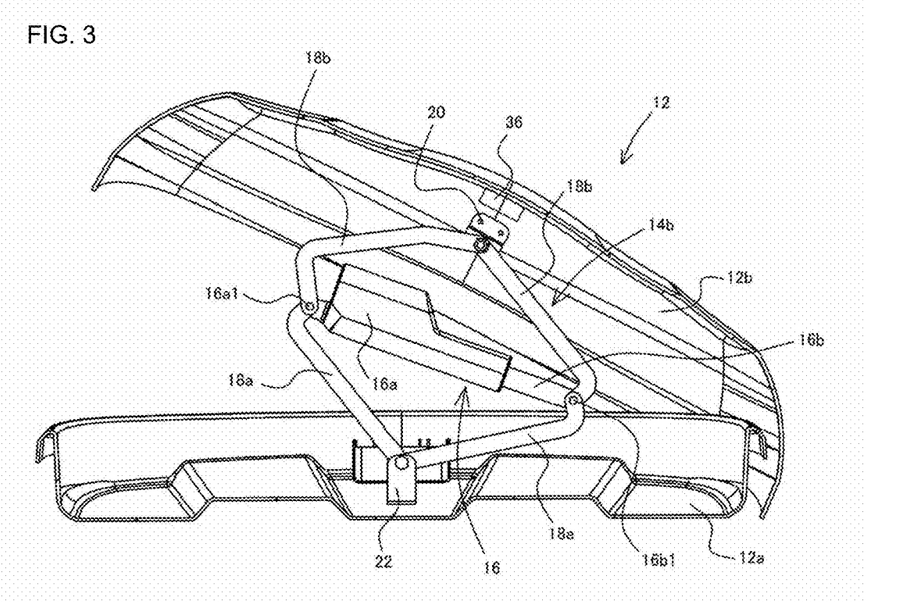
FIG. 3 is a partially cross-sectional side view illustrating a configuration of the roof box body in an opened state.

The opening/closing means 14a and 14b are housed in the roof box body 12 to perform an opening/closing operation of the openable/closable cover 12b described above. For example, an electric actuator 16 having a motor or the like may be employed as the opening/closing means 14a and 14b. As illustrated in FIGS. 2 and 3, the electric actuator 16 may have, for example, a main body 16a and a rod 16b telescopable with respect to the main body 16a. In addition, the electric actuator 16 may have shaft support portions 16a1 and 16b1 in a rear edge of the main body and a front edge of the rod, respectively.

In the electric actuator 16 having such a configuration, a link 18 actuated in response to an operation of the electric actuator 16 may be provided as follows. For example, as illustrated in FIGS. 2 and 3, a pantograph type link having upper and lower links 18b and 18a divided with respect to the electric actuator 16 may be employed. Specifically, the upper link 18b is divided in the vicinity of the center. Each upper link 18b has an engagement portion for engagement with an upper base 20 provided in the openable/closable cover 12b, and an engagement portion for engagement with the shaft support portions 16a1 and 16b1 provided in the main body 16a or the rod 16b of the electric actuator 16. Similar to the upper link 18b, the lower link 18a is also divided in the vicinity of the center. In addition, each lower link 18a has an engagement portion for engagement with a lower base 22 provided in the storage portion 12a and an engagement portion for engagement with the shaft support portions 16a1 and 16b1 provided in the main body 16a or the rod 16b of the electric actuator 16, respectively.

In this configuration of the opening/closing means 14a and 14b, as illustrated in FIG. 3, an opening angle between the upper and lower links 18b and 18a increases as the rod 16b of the electric actuator 16 is contracted. As a result, an interval between the upper and lower bases 20 and 22 increases, so that the openable/closable cover 12b has an opened state. Note that, when the opening/closing operation is performed, any one of left and right sides of the storage portion 12a and the openable/closable cover 12b in FIG. 2 is locked, so that it serves as a hinge (in FIG. 3, the left side is locked).

Figure 4:
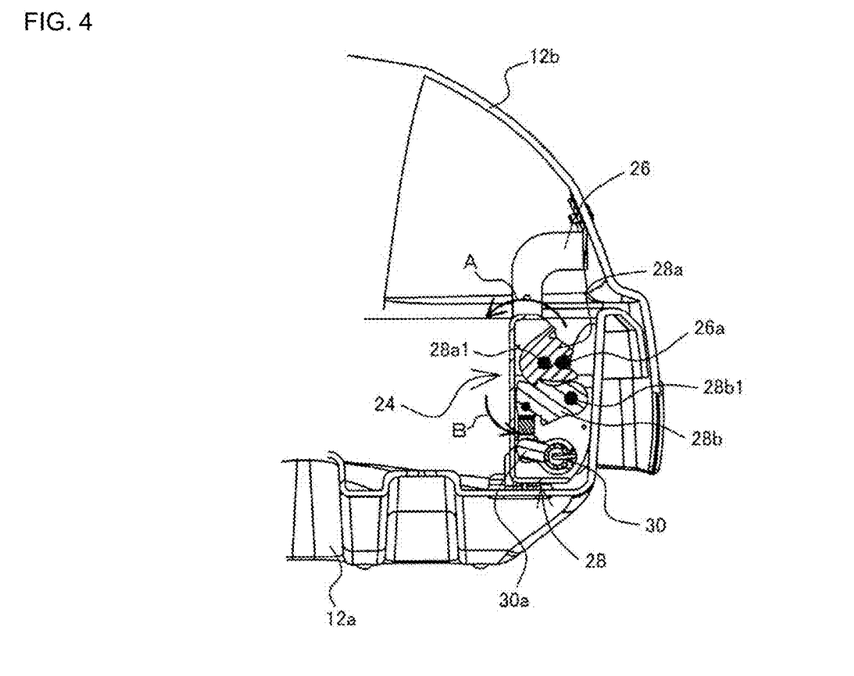
FIG. 4 is a partially enlarged cross-sectional view illustrating a lock mechanism.
Figure 5:
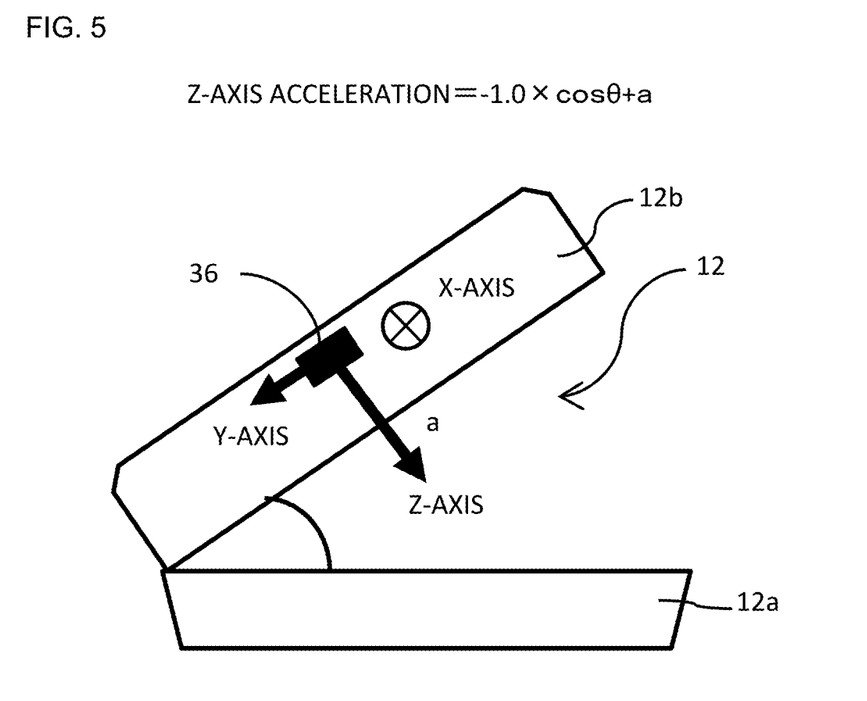
FIG. 5 is a diagram illustrating an inclination angle detected by a detection means.
Figure 6:
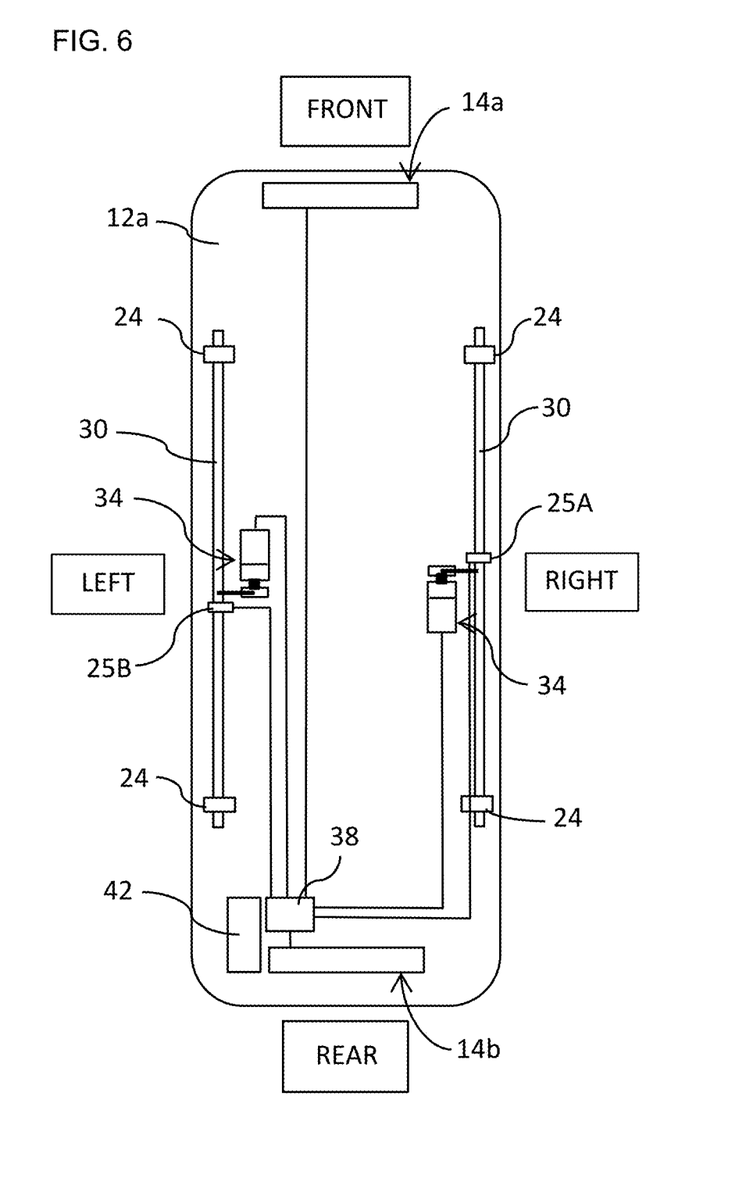
FIG. 6 is a plan view illustrating a schematic configuration of a storage portion.

The roof box body 12 according to the embodiment has a pair of opening/closing means 14a and 14b provided in the front and rear sides of the vehicle travel direction as illustrated in FIG. 6. Since the opening/closing means 14a and 14b are arranged in this manner, it is possible to suppress a distortion that may be generated when the openable/closable cover 12b is opened or closed. A lock mechanism 24 of the storage portion 12a against the openable/closable cover 12b is illustrated in FIG. 4. The lock mechanism 24 basically includes a locking member 26 provided in the openable/closable cover 12b, and a fastening portion 28 provided in the storage portion 12a. The locking member 26 has a locking pin 26a. As the locking pin 26a is locked to a lock hook 28a provided in the fastening portion 28, a function of the lock mechanism 24 is exhibited.

The lock hook 28a is pivotable around a support shaft 28a1 in the arrow direction "A". In addition, the lock hook 28a meshes with a lock cam 28b, so that pivoting to the arrow direction "A" is interfered. The lock cam 28b is pivoted around the support shaft 28b1 in the arrow direction "B" so that meshing with the lock hook 28a is released.

A fastening release pole 30 is configured to pivot the lock cam 28b in the arrow direction "B" through the link 30a. In this configuration, as the locking pin 26a is engaged with the lock hook 28a, the locking pin 26a is locked by the lock cam 28b. As a result, a locked state of the lock mechanism 24 is completed. Meanwhile, as the fastening release pole 30 is pivoted, the lock cam 28b is pivoted in the arrow direction "B" through the link 30a, so that meshing with the lock hook 28a is released. As a result, the lock hook 28a can be freely pivoted in the arrow direction "A", so that the locked state of the lock mechanism 24 is released.

The roof box body according to an embodiment has a plurality of lock mechanisms 24 (a pair of front and rear lock mechanisms 24 in the example of FIG. 6) along each side (in each of left and right sides) of the vehicle travel direction as illustrated in FIG. 6. The lock hook 28a included in each lock mechanism 24 is axially supported by a single fastening release pole 30 in each side, so that all the lock mechanisms 24 are unlocked in each side by pivoting the fastening release pole 30.

Figure 7:
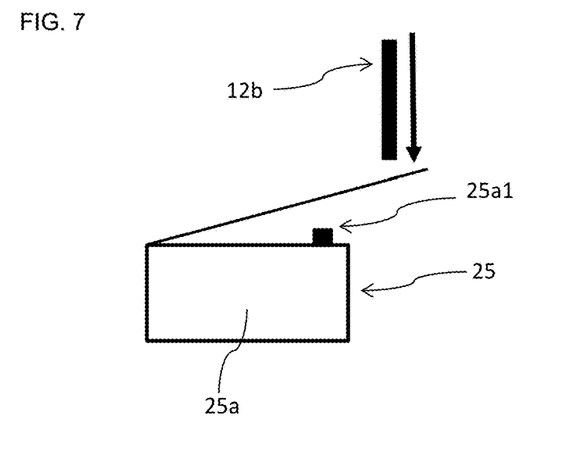
FIG. 7 is a diagram illustrating an example of an opened/closed state detection means using a micro switch.
Figure 8:
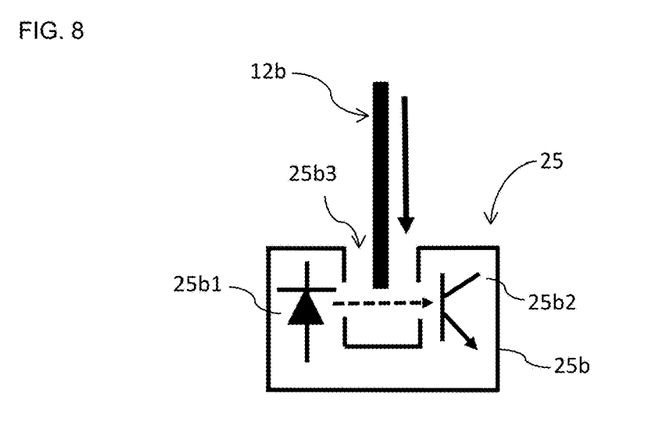
FIG. 8 is a diagram illustrating an example of the opened/closed state detection means using a transmissive photointerrupter.
Figure 9:
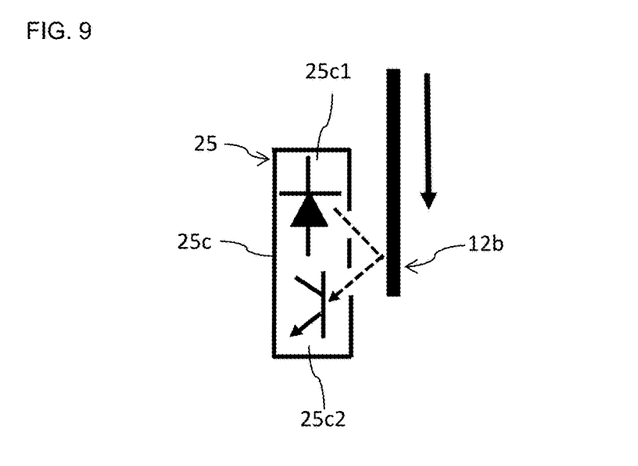
FIG. 9 is a diagram illustrating an example of the opened/closed state detection means using a reflective photointerrupter.

Opened/closed state detection means 25A and 25B for detecting a closed state of the openable/closable cover 12b are provided in the vicinity of the lock mechanism 24 of each side. The opened/closed state detection means 25A and 25B may include, for example, a micro switch 25a as illustrated in FIG. 7 or a photointerrupter 25b or 25c or the like as illustrated in FIG. 8 or 9. The opened/closed state detection means 25 including the micro switch 25a as illustrated in FIG. 7 can detect whether or not the openable/closable cover 12b is in a closed state as an end portion or a part of the openable/closable cover 12b presses a switch 25a1 of the micro switch 25a. In addition, the photointerrupter 25b of FIG. 8 can detect whether or not the openable/closable cover 12b is in a closed state as an end portion or a part of the openable/closable cover 12b is inserted into a slit 25b3 provided between a light emitting portion 25b1 and a light receiving portion 25b2, so that the light to the light receiving portion 25b2 is blocked. Furthermore, the photointerrupter 25c of FIG. 9 can detect whether or not the openable/closable cover 12b is in a closed state as an end portion or a part of the openable/closable cover 12b is arranged between a light emitting portion 25c1 and a light receiving portion 25c2, so that the light from the light emitting portion 25c1 is reflected on the light receiving portion 25c2.

Unfastening mechanisms 34a and 34b are installed in each of the fastening release poles 30. The unfastening mechanisms 34a and 34b are mechanisms for pivoting the fastening release pole 30 caused by driving a motor by a motor, a gear, a wire, a belt, or the like. Since the fastening release pole 30 can be pivoted using a motor, it is possible to remotely control the operations from the fastening release operation to the opening operation of the openable/closable cover 12b. Note that, since the motor is driven in response to a fastening release signal, the motor is electrically connected to the control means 38.

Figure 10:
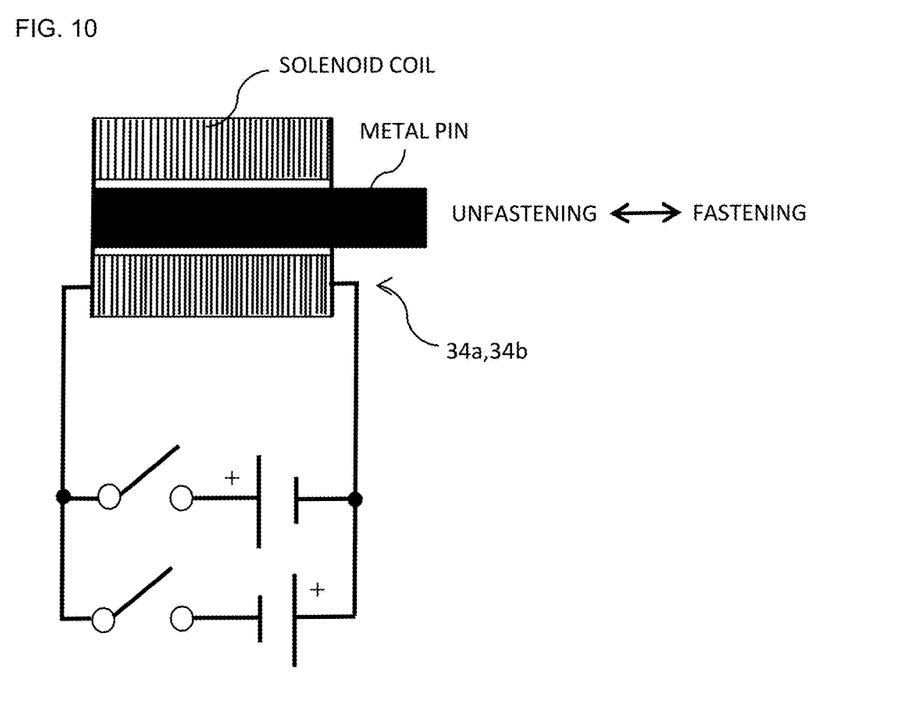
FIG. 10 is a diagram illustrating a configuration in a case where a solenoid type electronic key is employed as an unfastening mechanism.

A solenoid type electronic key may be employed as the unfastening mechanism as illustrated in FIG. 10. In the unfastening mechanisms 34a and 34b illustrated in FIG. 10, a metal pin disposed inside a coil may advance or retreat by switching a flow direction of the current against a solenoid coil. Therefore, the fastening release pole described above may be pivoted by virtue of movement of the metal pin, or the metal pin may function as the lock hook 28a of the lock mechanism 24 to substitute the lock mechanism 24.

The detection means 36 is a sensor for detecting acceleration for opening or closing the openable/closable cover 12b described above. Therefore, the detection means 36 may include, for example, an acceleration sensor or the like. Note that, assuming that the acceleration of the open/close direction (Z-axis direction in FIG. 5) is detected by the acceleration sensor, if the acceleration of the Z-axis direction is constant, the acceleration becomes zero except for when starting and stopping the opening/closing operation. Therefore, if the acceleration is detected within a predetermined opening/closing operation time, it is possible to determine whether or not an abnormality occurs in the opening/closing operation on the basis of this acceleration signal. In addition, if the acceleration of the X-axis direction (vehicle travel direction) in FIG. 5 can be detected using the detection means 36, it is possible to detect movement of the vehicle. Therefore, it is possible to detect whether or not the openable/closable cover 12 is in the closed state when a vehicle moves on the basis of detection data of the opened/closed state detection means 25A and 25B or the unfastening mechanisms 34a and 34b and the acceleration of the X-axis direction.

The control means 38 outputs a command signal for controlling opening/closing and stopping of the openable/closable cover 12b and a notification signal for preventing a vehicle from moving while the openable/closable cover 12b is opened. The command signal from the control means 38 may include, for example, a command signal based on the opening/closing operation signal from the manipulation means 54 described below, a command signal for instructing an emergency stop of the openable/closable cover 12b, and the like. For this reason, the control means 38 is provided with a radio module 40 for transmitting or receiving a signal to or from the manipulation means 54.

The command signal for the emergency stop may be output, for example, in a case where a part of a human body or an article is nipped between the storage portion 12a of the roof box body 12 and the openable/closable cover 12b, a case where the opening operation of the openable/closable cover 12b is interfered as the openable/closable cover 12b abuts on an obstacle that may exist thereover during its opening operation, or the like. The command signal for the emergency stop is output, for example, on the basis of the following determination. First, as the opening/closing operation signal is input from the manipulation means 54, and the command signal is output, the control means 38 detects acceleration for opening or closing the openable/closable cover 12b using the detection means 36.

In a case where the opening/closing operation of the openable/closable cover 12b is normally performed, the acceleration except for a gravitational acceleration component detected by the detection means 36 becomes zero. In comparison, in a case where the opening/closing operation is interfered as an article is nipped between the openable/closable cover 12b and the storage portion 12a, or the openable/closable cover 12b abuts on an obstacle, deceleration or acceleration (not zero) is detected within a predetermined opening/closing operation time. If the detection means 36 detects deceleration or acceleration within the opening/closing operation time, the control means 54 determines that nipping or abutting of an obstacle occurs and outputs the command signal for an emergency stop.

By performing such a control, it is possible to stop the opening/closing operation before a load becomes significant even when the openable/closable cover 12*b* or the storage portion 12*a* is distorted. Therefore, it is possible to ensure safety. Note that the command signal for the emergency stop may be a command signal for performing a reversing operation for the opening or closing operation. That is, if a command signal for the reversing operation is input during the opening operation, the openable/closable cover 12*b* is changed over to the closing operation.

In the roof box 10 having such a configuration, power is consumed at least in the operation of the opening/closing means 14 and the operation of the lock mechanism 24. For this reason, a power supply means 42 such as a battery is provided in the storage portion 12*a*. Since the power supply means 42 is provided, it is not necessary to provide a power line from the vehicle to the roof box body 12. As a result, it is possible to facilitate installation of the roof box body 12.

Figure 11:
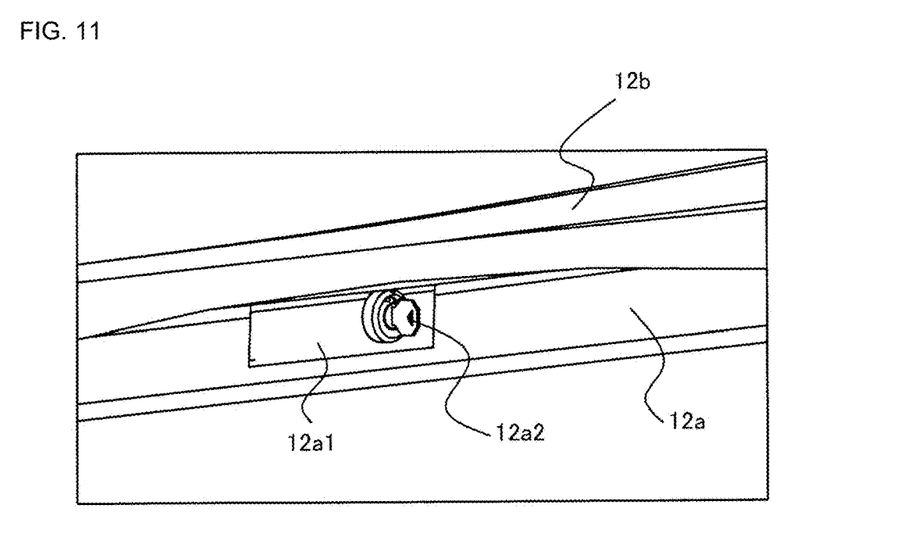
FIG. 11 is a diagram illustrating a closed state of a replacement cover provided in the roof box body.
Figure 12:
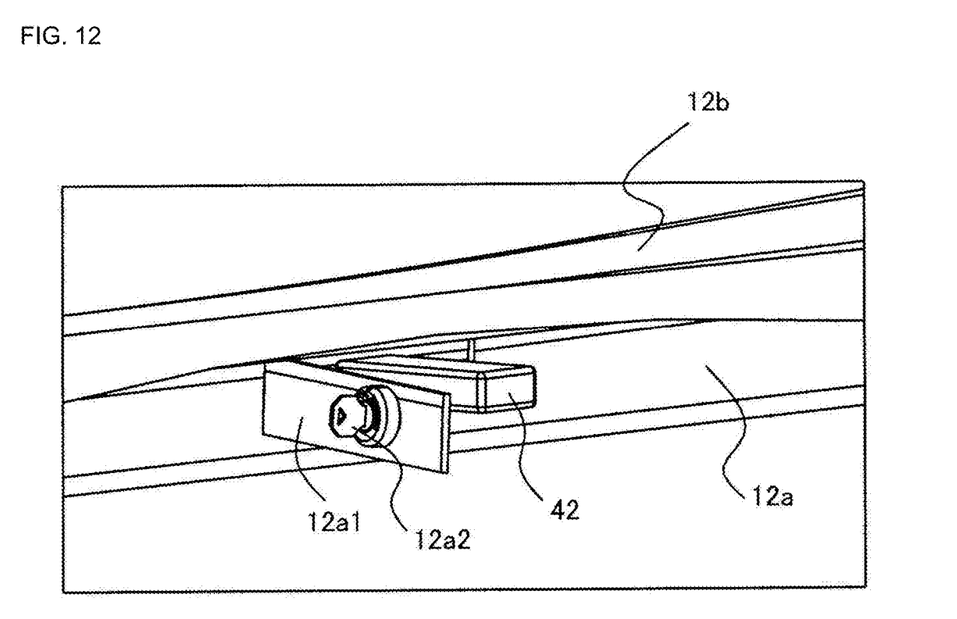
FIG. 12 is a diagram illustrating an opened state of the replacement cover provided in the roof box body.

The power supply means 42 such as a battery may have a configuration in which the battery can be replaced one by one. Alternatively, for example, the power supply means 42 may be charged with power generated from a power generation means 44 such as a solar panel. In this configuration, it is possible to reduce an effort of replacing the power supply means 42 or connecting a charger and charging the battery when the power is completely consumed. In addition, a replacement cover 12*a*1 that allows only the power supply means 42 to be removed and replaced may be provided in the storage portion 12*a* of the power supply means 42 separately from the opening and closing part of the openable/closable cover 12*b* as illustrated in FIGS. 11 and 12. Since only the power supply means 42 can be removed and replaced while the openable/closable cover 12*b* of the roof box body 12 is closed, it is possible to avoid the roof box body 12 from being closed and not opened when the power is completely consumed. Note that the replacement cover 12*a*1 may be provided with a mechanical key 12*a*2 for fastening for closing in order to prevent mischief or the like.

In a case where the power supply means 42 is arranged in the roof box body 12, a part for supplying power to external devices such as a cigarette lighter socket 46 or a USB charging connector 48 may be provided. This may improve convenience of the roof box body 12. Note that a charging control circuit 50 may be provided between the power supply means 42 and the power generation means 44 if the power generation means 44 is connected to the power supply means 42. In addition, naturally, a power circuit 52 for controlling supplied power is provided between the control means 38 that supplies power, the cigarette lighter socket 46, or the USB charging connector 48 and the power supply means 42.

The manipulation means 54 serves as a remote controller for outputting an opening/closing operation signal to the control means 38 or a notification means that receives a notification signal from the control means 38. The manipulation means 54 may include, for example, a high-performance portable terminal such as a smart phone or a smart timepiece, a dedicated remote controller, or the like. In addition, a vehicle-mounted device may be used as the manipulation means. However, considering that the opening/closing operation of the roof box body 12 is performed outside a vehicle, it is desirable that the function of the manipulation means 54 is provided in a portable terminal.

Figure 13:
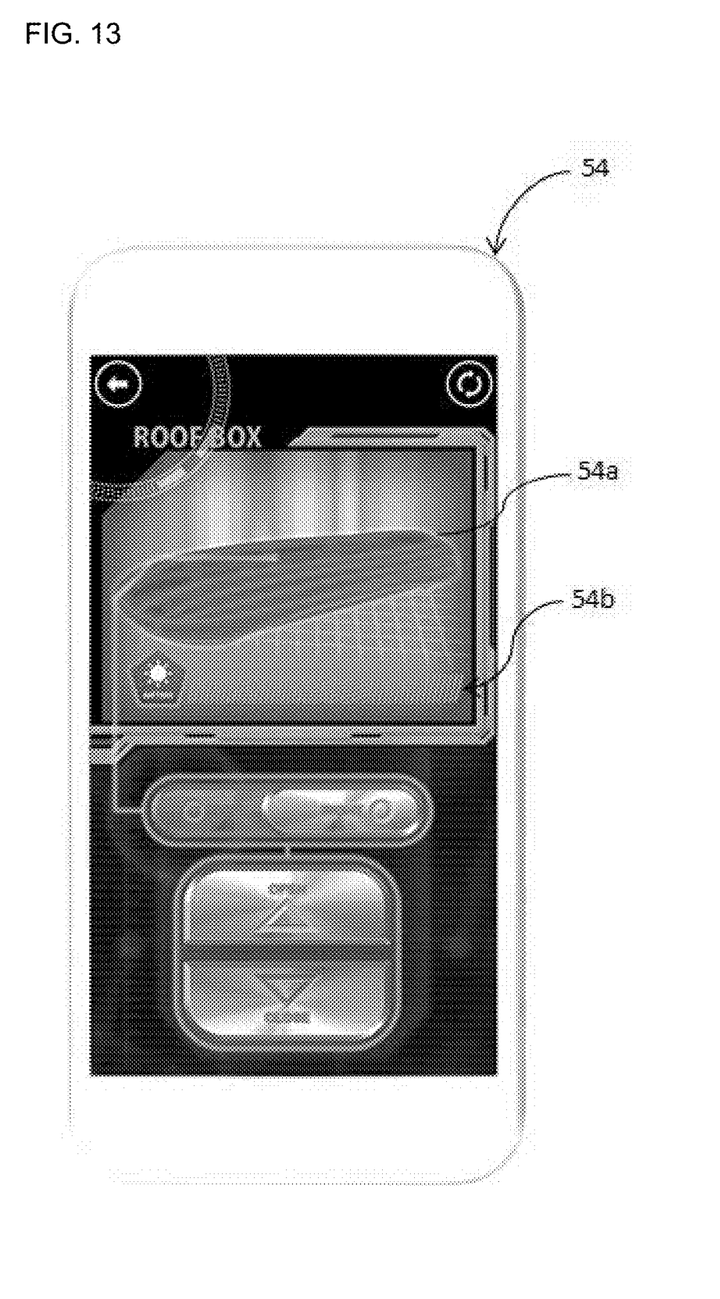
FIG. 13 is a diagram illustrating a configuration example of a manipulation screen in a case where a smart phone is used as a manipulation means.

FIG. 13 illustrates an example of a manipulation screen in a case where a smart phone is used as the manipulation means 54. On the manipulation screen, touch keys "RIGHT" and "LEFT" are displayed regarding which side of the roof box is opened. Here, the directions "RIGHT" and "LEFT" may be set to right and left sides of a vehicle along the longitudinal direction of the roof box body 12.

In addition, touch keys "OPEN" and "CLOSE" are displayed on the manipulation screen, regarding whether the openable/closable cover 12*b* is opened or closed. The manipulation screen may include other display elements such as a panoramic view 54*a* of the roof box, a battery condition 54*b* of the power supply means 42 for operating the electric actuator 16 or the lock mechanism 24, and the like. On such a manipulation screen, first, an operator selects a roof box opening/closing direction using the touch keys "RIGHT" and "LEVI", and then manipulates touch keys "OPEN" and "CLOSE" to instruct opening or closing of the openable/closable cover 12*b*. Note that the manipulation screen may have a function of providing an alarm or display for notifying that the openable/closable cover 12*b* is not closed when the notification signal is received from the control means 38.

Next, operations of the aforementioned configuration after the opening/closing command of the roof box 10 is issued is described. First, an operation for opening the openable/closable cover 12*b* is described. An operator selects an opening/closing direction of the roof box body 12 on the manipulation screen of the manipulation means 54. Then, an operator selects the touch key "OPEN" in order to open the roof box body 12. As the touch key "OPEN" is selected, an opening/closing operation signal including an opening/closing direction and an opening command of the roof box body 12 is transmitted to the control means 38. As the opening/closing operation signal is received, the control means 38 outputs a command signal for releasing the locked state of the opening side to the release-side lock mechanism 24. After the lock mechanism 24 is released in response to the output of the command signal, a command signal for performing an opening operation is output to the electric actuator 16.

Figure 14:
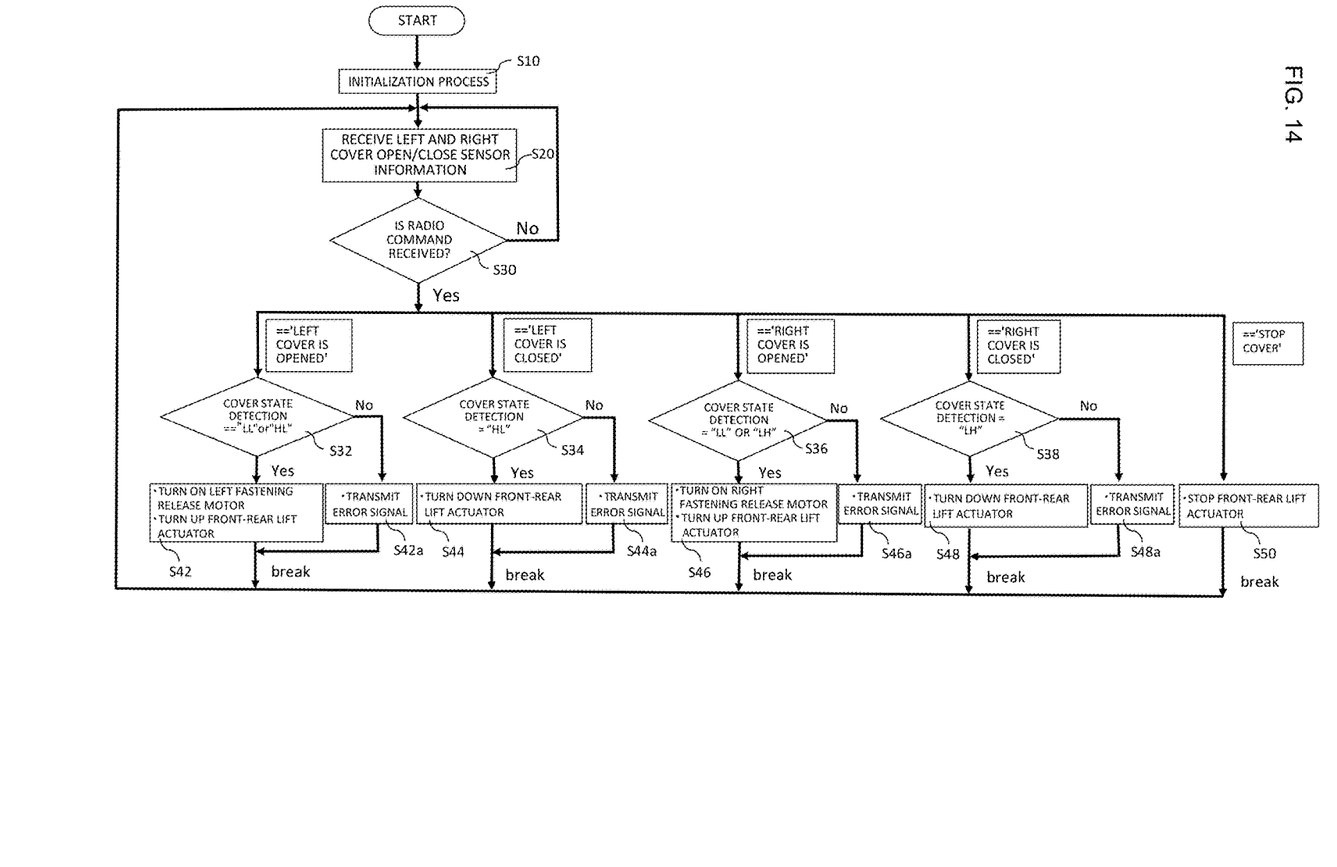
FIG. 14 is a flowchart illustrating a flow of a determination control in operations for opening, closing, and stopping the openable/closable cover using a control means.

The control signal of the control means 38 in this case is output as illustrated in FIG. 14. First, an initialization process is performed as a preparatory process (S10). Then, detection information is acquired from the opened/closed state detection means 25A and 25B (S20). After the detection information is input from the opened/closed state detection means 25A and 25B, it is determined whether or not the opening/closing operation signal is received from the manipulation means 54 (S30). If the opening/closing operation signal is not received, the process returns to S20, and the detection information is acquired from the opened/closed state detection means 25A and 25B. Otherwise, if the opening/closing operation signal is received, a corresponding process is performed.

For example, if an opening/closing operation signal for opening the left side of the openable/closable cover 12*b* is input, the process advances to S32, and it is determined whether the left and right sides of the openable/closable cover 12*b* are closed ("LL"), or whether only the left side is opened ("HL"). If the determination is YES, the unfastening mechanism 34*b* is activated to operate the opening/closing means 14*a* and 14*b* (S42). Meanwhile, if the determination of S32 is NO, an error signal is transmitted (S42*a*), and the process returns to S20. If an opening/closing operation signal for opening the right side of the openable/closable cover 12*b* is input after S30, the process advances to S36, and it is determined whether the left and right sides of the openable/closable cover 12*b* are closed ("LL"), or whether only the right side is opened ("LH"). If the determination is YES, the unfastening mechanism 34a is operated, and then the opening/closing means 14a and 14b are operated (S46). Otherwise, if the determination of S36 is NO, an error signal is transmitted (S46a), and the process returns to S20.

In such a control operation, the roof box 10 is automatically opened or closed just by the manipulation performed on the manipulation means 54. Here, if the opening operation is interfered by an obstacle or the like that abuts while the openable/closable cover 12b is opened, the control means 38 outputs a command signal for stopping the opening operation to the electric actuator 16 (the opening/closing means 14a and 14b). As a result, the opening operation of the openable/closable cover 12b stops (S50).

Next, a closing operation of the openable/closable cover 12b is described. The closing operation is for closing the openable/closable cover 12b having the opened state. Therefore, the touch key "CLOSE" is selected on the manipulation screen of the manipulation means 54. If the touch key "CLOSE" is selected, an opening/closing operation signal for closing the openable/closable cover 12b is transmitted to the control means 38. As the opening/closing operation signal is received, the control means 38 outputs a command signal for the closing operation to the electric actuator 16.

As the control signal of the control means 38, for example, in a case where an opening/closing operation signal for closing the left side of the openable/closable cover 12b is received, the process advances to S34, and it is determined whether or not only the left side of the openable/closable cover 12b is opened ("HL" state). If the determination is YES, the opening/closing means 14a and 14b are operated (S44). Otherwise, if the determination of S34 is NO, an error signal is transmitted (S44a), and the process returns to S20.

In a case where an opening/closing operation signal for closing the right side of the openable/closable cover 12b is received, the process advances to S38, and it is determined whether or not only the right side of the openable/closable cover 12b is opened ("LH" state). If the determination is YES, the opening/closing means 14a and 14b are operated (S48). Otherwise, if the determination of S38 is NO, an error signal is transmitted (S48a), and the process returns to S20.

Here, in a case where the closing operation is interfered by a human body or obstacle nipped between the storage portion 12a and the openable/closable cover 12b while the openable/closable cover 12b is closed, the control means 38 outputs a command signal for stopping the closing operation to the electric actuator 16 (the opening/closing means 14a and 14b). As a result, the closing operation of the openable/closable cover 12b stops (S50).

In the roof box 10 according to an embodiment, when the detection means 36 detects that a vehicle moves in a state in which the closed state of the openable/closable cover 12b is not checked by the opened/closed state detection means 25a and 25b or a state in which the unfastening mechanisms 34a and 34b receive a lock release signal, the control means outputs a notification signal to the manipulation means 54. The manipulation means 54 that receives the notification signal notifies an operator of a fact that the openable/closable cover 12b is not in the closed state using an alarm or display.

In this manner, using the roof box 10 according to this embodiment, it is possible to automatically perform operations from the lock release operation, to the opening operation, and to the closing operation just by selecting the touch key on the manipulation means 54. In addition, since whether or not an interference occurs in the opening or closing operation is determined on the basis of a change of acceleration at the time of the opening/closing operation of the openable/closable cover 12b, it is possible to stop the operation of the openable/closable cover 12b even when a load generated in the electric actuator 16 is not increased due to a distortion generated in the openable/closable cover 12b. Therefore, it is possible to ensure safety of the opening/closing operation.

In a case where movement of a vehicle is detected while the openable/closable cover 12b is not closed, the notification means such as the manipulation means 54 notifies an operator of this fact. Therefore, it is possible to avoid a vehicle from traveling while the openable/closable cover 12b is opened. In addition, since a portable terminal is employed as the manipulation means 54, it is possible to improve convenience of manipulation outside a vehicle.

INDUSTRIAL APPLICABILITY

Figure 15:
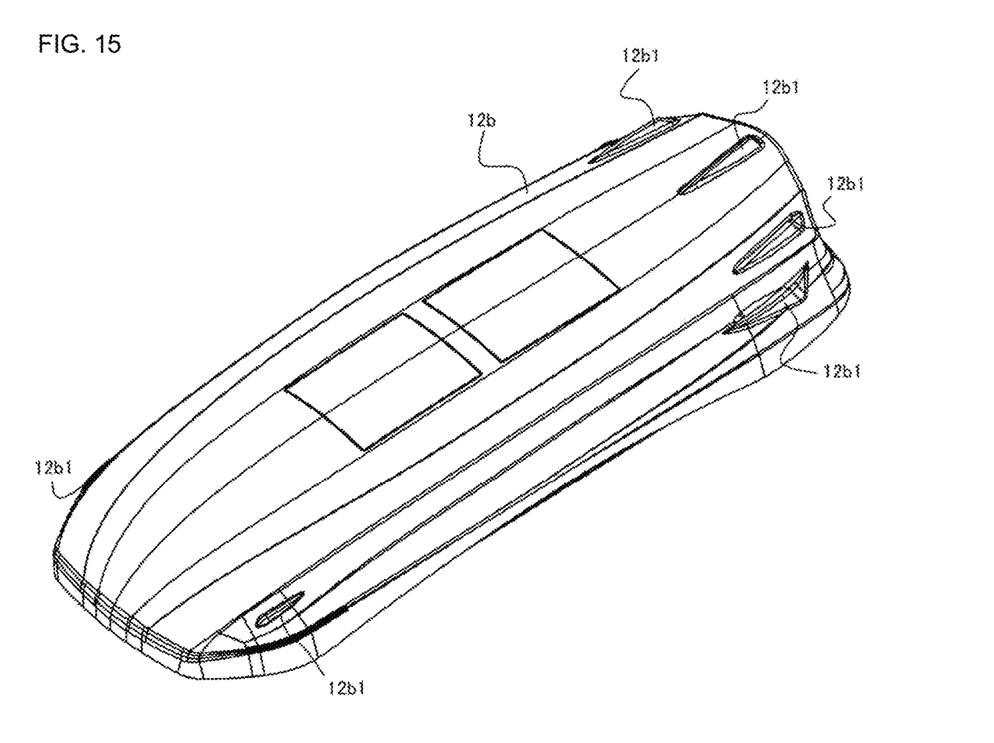
FIG. 15 is a diagram illustrating a state in which fins are provided on the openable/closable cover.

Although a specific configuration of the roof box body 12 is not described in the aforementioned embodiment, a fin 12b1 may be provided in the openable/closable cover 12b of the roof box body 12 as illustrated in FIG. 15. It is possible to obtain a rectification effect by providing a plurality of fins 12b1 having a main surface along a vehicle travel direction on a surface of the openable/closable cover 12. As a result, it is possible to suppress turbulence generated in rear of the roof box body 12 and obtain effects such as improvement of fuel economy and rectilinear stability and reduction of noise.

REFERENCE SIGNS LIST 10 roof box,
12 roof box body,
12a storage portion,
12b openable/closable cover,
14 opening/closing means,
16 electric actuator,
16a main body,
16a1 shaft support portion,
16b rod,
16b1 shaft support portion,
18 link,
18a lower link,
18b upper link,
20 upper base,
22 lower base,
24 lock mechanism,
25 opened/closed state detection means,
26 locking member,
26a locking pin,
28 fastening portion,
28a lock hook,
30 fastening release pole,
34 unfastening mechanism,
36 detection means,
38 control means,
40 radio module,
42 power supply means,
44 power generation means,
46 cigarette lighter socket,
48 USB charging connector,
50 charging control circuit,
52 power circuit,
52 manipulation means.

The invention claimed is:

1. A roof box comprising:
   a roof box body having a storage portion and an openable/closable cover;
   a plurality of lock mechanisms provided on both sides of the roof box body along a travel direction to engage and fasten the storage portion and the openable/closable cover while the roof box body is mounted;
   a fastening release pole installed in each lock mechanism of the plurality of lock mechanisms provided on both sides of the roof box body to release the engagement and fastening of the storage portion;
   an opening/closing mechanism configured to open or close the openable/closable cover with respect to any one lock mechanism of the plurality of lock mechanisms when the engagement and fastening of another lock mechanism of the plurality of lock mechanisms is released;
   a remote controller configured to transmit an opening/closing operation signal selecting a lock mechanism of the plurality of lock mechanisms for releasing the engagement and fastening and opening/closing of the openable/closable cover using the opening/closing mechanism;
   a control circuit configured to receive the opening/closing operation signal from the remote controller, output an engagement release signal to the selected lock mechanism of the plurality of lock mechanisms, and output an opening/closing signal for releasing the openable/closable cover to the opening/closing mechanism after the engagement is released; and
   an opened/closed state sensor that detects a side in which the openable/closable cover is released, wherein:
   the control circuit determines whether a side where engagement of the selected lock mechanism is released matches the side detected by the opened/closed state sensor as being released, and
   the control circuit outputs a command signal for stopping an opening/closing operation of the openable/closable cover to the opening/closing mechanism in response to determining that the sides do not match.

2. The roof box according to claim 1, further comprising:
   an acceleration sensor configured to detect an acceleration of the openable/closable cover while the opening/closing operation of the openable/closable cover using the opening/closing mechanism is performed at a constant speed,
   wherein the control circuit outputs the command signal for stopping or reversing the opening/closing operation of the openable/closable cover to the opening/closing mechanism when deceleration or acceleration generated by a force applied from an exterior of the openable/closable cover is detected.

3. The roof box according to claim 2 wherein:
   the acceleration sensor has an acceleration detection function in a direction along a vehicle travel direction,
   the control circuit outputs a notification signal in response to detecting the acceleration in the direction along the vehicle travel direction in at least one of (i) the opened/closed state sensor detects that any one side of the openable/closable cover is released, and (ii) the engagement and fastening of the lock mechanism of the plurality of lock mechanisms is released, and
   the remote controller has a notification function for receiving and notifying the notification signal from the control circuit.

4. The roof box according to claim 1, wherein the remote controller is a portable terminal having a communication device configured to communicate with the control circuit.

5. The roof box according to claim 1, wherein the roof box body has a power supply configured to supply power for the opening/closing operation, and
   the roof box body has an emergency opening/closing portion for extracting the power supply without opening the openable/closable cover.

* * * * *